United States Patent
Barker et al.

(10) Patent No.: US 8,161,996 B2
(45) Date of Patent: Apr. 24, 2012

(54) RESILIENT SEATED BUTTERFLY VALVE WITH INTERCHANGEABLE OFF-CENTER AND ON-CENTER DISCS

(75) Inventors: James E. Barker, Sauk Rapids, MN (US); Albert W. Libke, Royalton, MN (US); Steven K. Neu, Payneseville, MN (US)

(73) Assignee: DeZURIK, Inc., Sartell, MN (US)

( * ) Notice: Subject to any disclaimer, the term of this patent is extended or adjusted under 35 U.S.C. 154(b) by 1028 days.

(21) Appl. No.: 12/104,737

(22) Filed: Apr. 17, 2008

(65) Prior Publication Data

US 2009/0014675 A1    Jan. 15, 2009

Related U.S. Application Data

(60) Provisional application No. 60/912,291, filed on Apr. 17, 2007.

(51) Int. Cl.
*F16K 1/22* (2006.01)
(52) U.S. Cl. .......... 137/269; 251/306; 251/314
(58) Field of Classification Search .......... 251/305–308, 251/314; 137/269, 270, 271
See application file for complete search history.

(56) References Cited

U.S. PATENT DOCUMENTS

| | | | | |
|---|---|---|---|---|
| 2,412,918 | A | * | 12/1946 | Sladky ........................ 137/269 |
| 3,473,784 | A | * | 10/1969 | Radford ........................ 251/306 |
| 3,589,675 | A | * | 6/1971 | Scaramucci ................. 251/151 |
| 3,642,247 | A | * | 2/1972 | Scaramucci ................. 251/148 |
| 3,656,714 | A | | 4/1972 | Peterson |
| 3,675,888 | A | | 7/1972 | Scaramucci |
| 3,809,361 | A | * | 5/1974 | Pfundstein et al. .......... 251/305 |
| 4,206,903 | A | * | 6/1980 | Scaramucci ................. 251/174 |
| 4,225,113 | A | | 9/1980 | Barthelemy et al. |
| 4,604,254 | A | | 8/1986 | Yamamoto et al. |
| 4,890,816 | A | * | 1/1990 | Nicholson .................... 251/174 |
| 5,160,118 | A | * | 11/1992 | Stary ............................. 251/173 |
| 6,726,176 | B2 | * | 4/2004 | Bauman ........................ 251/305 |

FOREIGN PATENT DOCUMENTS

JP    08-296748    8/1986

OTHER PUBLICATIONS

PCT International Search Report and Written Opinion, Date of Mailing: Sep. 1, 2008, 10 pages.

* cited by examiner

*Primary Examiner* — John Bastianelli
(74) *Attorney, Agent, or Firm* — Pauly, DeVries Smith & Deffner, L.L.C.

(57) ABSTRACT

The resilient seated butterfly valve has a common spherical center for receiving either an on-center or off-center disc, both of which are rotatably mounted in the body. A seal has a seat spherical surface. The seal is affixed to the circumference of the valve chamber. It has an on-center seal region for engagement with the on-center spherical sealing edge of the on-center disc. The seal has an off-center seal region for engagement with the off-center spherical sealing edge of the off-center disc. The seal may include an outlet flange, an outlet ramp, an inlet ramp, and an inlet flange. The front face of the seal for the off-center disc extends beyond the position of the front face of the seal for the on-center disc.

10 Claims, 12 Drawing Sheets

*Off-Center*  *On-Center*

Figure 2A  Figure 2B

Figure 3A — Off-Center

Figure 3B — On-Center

On-Center

Figure 12

On-Center

SECTION A-A

Figure 17

Off-Center

Figure 16

Off-Center

Figure 18

RESILIENT SEATED BUTTERFLY VALVE WITH INTERCHANGEABLE OFF-CENTER AND ON-CENTER DISCS

PRIORITY

This application claims priority to U.S. Provisional Application 60/912,291, filed Apr. 17, 2007, the content of which is herein incorporated by reference.

FIELD OF EMBODIMENTS

The resilient seated butterfly valve with interchangeable off-center and on-center discs relates generally to the field of flow control valves in pipe systems.

BACKGROUND OF EMBODIMENTS

Butterfly valves have been available to industry for some time. They typically have a long service life and are light weight, inexpensive, and known for their reliability. Butterfly valves include a body having inlet and outlet ports and, a resilient or flexible seal, and a disc or mounted for rotation with a shaft, so that the disc is rotated to close off flow through the seat area, open flow through the seat area, or throttle flow through the seat area. Butterfly valves handle a wide variety of liquids, gases, and solids, including water, air, petroleum, paint, and chemicals. They are used extensively in hot-process applications; water treatment; HVAC; mining operations; paper milling; flow control of dry pellets, beads, chemicals, and feed stocks; and vacuum applications. They are available in lugged, wafer, and flanged body styles.

On center disc/seat valves are the most common type manufactured worldwide. As compared to off-center disc/seat valves, on center disc/seat valves usually have higher flow capacity, but lower pressure ratings and a shorter cycle life.

As compared to on-center disc/seat valves, off-center disc/seat valves have higher inherent pressure ratings, higher resistance to fluid transients (hammer), and higher integrity, longer cycle life seats. Off-center seating is less commonly used in resilient (elastomeric) seated industrial valves. The seating may not be fully rated bi-directional. Additionally, the operating torque is typically higher in one direction versus the other. This impacts the cost of the valve because the size of the actuator must be increased to overcome the operating torque during opening and closing of the off-center valve in the high operating torque direction.

On-center and off-center disc/seat butterfly valves and serve their respective objectives and, therefore, both types are in demand. Unfortunately, this requires manufacturers, distributors, and at times valve users to maintain a costly inventory of both valve types.

Accordingly, a butterfly valve with interchangeable on-center and off-center discs that use a common body will substantially reduce inventory and allow easy retrofitting of butterfly valves with alternate interchangeable on-center and off-center discs.

SUMMARY

The resilient seated butterfly valve 1 has a common spherical center for receiving either an on-center 2 or off-center 14 disc, both of which are rotatably mounted in the body 4. A seat seal 3 affixed to an the inner circumference of the valve 1 has an on-center seal region 19B for engagement with the on-center spherical sealing edge 2C of the on-center disc 2 and an off-center seal region 19A for engagement with the off-center spherical sealing edge 14C of the off-center disc 14. The front face 14A of the off-center disc 14 extends beyond the front face 2A of the on-center disc 2 relative to the seat seal 3. The seat seal 3 may also be comprised of an outlet flange 11A, an outlet ramp 3A, a seat spherical surface 3E, an inlet ramp 3B, and an inlet flange 12A.

A seat seal surface 3C provides positive sealing between the spherical sealing edges 2C and 14C of the interchangeable on-center 2 or off-center 14 discs and their respective on-center and off-center seal regions 19B and 19A, which with the common spherical center of the seal 3C allows the on-center 2 and off-center 14 discs to be interchangeable.

An embodiment of the butterfly valve is comprised of: (a) a body 4 having a rotatable shaft 5 aligned with a vertical center-line 7A of the body 4; (b) a resilient circumferential seal 3 affixed to a circumferential body seat 3D; (c) an on-center disc 2 affixed to a shaft 5 and an off-center disc 14 affixed to a shaft 5, the on-center disc 2 and the off-center disc 14 interchangeable with one another; (d) the resilient circumferential seat seal 3 comprising a section of a sphere, the center of which is located on the intersection of the vertical center-line 7A extending through shaft 5 and the horizontal center-line 7B extending through the horizontal center of a disc 2 or 14, an off-center seal region 19A proximal to the inlet port 12, and an on-center seal region 19B distal from the inlet port 12; (e) the on-center disc 2 comprising (i) a spherical sealing edge 2C, the center of which is located on the intersection of the vertical center-line 7A extending through shaft 5 and the horizontal center-line 7B extending through the horizontal center of the disc 2; (ii) the spherical sealing edge 2C configured for closure with the on-center seal region 19B; and (iii) a front face 2A of the on-center disc 2; and (f) the off-center disc 14 comprising (i) a spherical sealing edge 14C, the center of which is located on the intersection of the vertical center-line 7A extending through shaft 5 and the horizontal center-line 7B extending through the horizontal center of the disc 14; (ii) the spherical sealing edge 14C configured for closure with the off-center seal region 19A; and (iii) an eccentric front face 14A of the off-center disc 14, the front face 14A of which extends beyond the front face 2A of the on-center disc 2.

Another embodiment of the butterfly valve is comprised of: (a) an outlet flange seal 17B for sealing between an outlet flange 11A and an outlet pipe 17 and (b) an inlet flange seal 17A for sealing between an inlet flange 12A and an inlet pipe 17. An embodiment of the butterfly valve may also be comprised of a compressible outlet ramp 3A and a compressible inlet ramp 3B for leading the spherical sealing edges 2C or 14C into a closed position.

The resilient circumferential seat seal 3 of a further embodiment also comprises (a) a smaller distance between the inlet flange 12A and the front faces 2A or 14A as compared to the distance between the outlet flange 11A and the rear faces 2B or 14B; (b) an angle of the inlet ramp 3B that is steeper than the angle of the outlet ramp 3A; and (c) whereby installation of the discs 2 and 14 is facilitated.

In an embodiment of the resilient circumferential seat seal 3C there are upper and lower end apertures 5F and 5E for rotatable mounting of the shaft 5 on the vertical center-line extending through the shaft 5. In another embodiment, the areas of the inlet and outlet ports 12 and 11 are the same, whereby fluid flow through the valve is constant. Another embodiment of the butterfly valve is comprised of on-center or off-center discs 2 or 14 that are rotatable through an uninterrupted 360° and are bi-directionally rotatable. An embodiment also comprises an outlet flange seal 17B, inlet flange seal 17A, outlet ramp 3A, and inlet ramp 3B that are integral parts of seat seal 3.

Additional embodiments include the following:

A seal surface 3C having a seat spherical surface 3E for mating engagement of the spherical sealing edges 14C or 2C with the respective interchangeable off-center or on-center discs 14 or 2.

A seat spherical surface 3E that may also be comprised of an off-center seal region 19A and an on-center seal region 19B for engagement with respective off-center or on-center spherical sealing edges 14C or 2C.

A seal surface 3C comprised of spherical sealing edges 14C or 2C of the respective interchangeable off-center or on-center discs 14 or 2 having a common spherical center.

Upper and lower end apertures 5F and 5E in the seat seal 3C and upper and lower bores 6A and 6B in the body 4, the apertures and bores in-line with the vertical axis of the body 4 and interchangeable off-center or on-center discs 14 or 2 mounted on a rotatable shaft 5 in the upper and lower bores 6A and 6B. A seal surface 3C that is resilient.

A front face 4A of the interchangeable off-center disc 14 that extends beyond the front face 2A of the interchangeable on-center disc 2.

An inlet flange seal 17A, an inlet ramp 3B, an outlet ramp 3A, and an outlet flange seal 17B. A seat seal 3 that is resilient.

The resilient seated butterfly valve 1 with interchangeable on-center and off-center discs 2 and 14 has been rather broadly outlined in this summary in order that the detailed description of the embodiments that follow may be better understood.

The embodiments in this specification are not intended to be limited to their details of construction and arrangement of components. There may be embodiments in addition to those described that are capable of being practiced and carried out in various ways. Moreover, the phraseology and terminology used in this specification, as well as the abstract, are for the purpose of description and are not intended to be limiting.

As such, those skilled in the art will appreciate that the conception upon which this specification is based may be readily utilized as a basis for designing other structures, methods, and systems for carrying out the several purposes of the embodiments. It is important and it is the intention, therefore, that the claims be regarded as including such equivalent constructions insofar as they do not depart from the spirit and scope of the embodiments.

DESCRIPTION OF DRAWINGS

The following Figures are of various embodiments of butterfly valve 1.

DESCRIPTION OF EMBODIMENTS

Overview

Figure 1A:
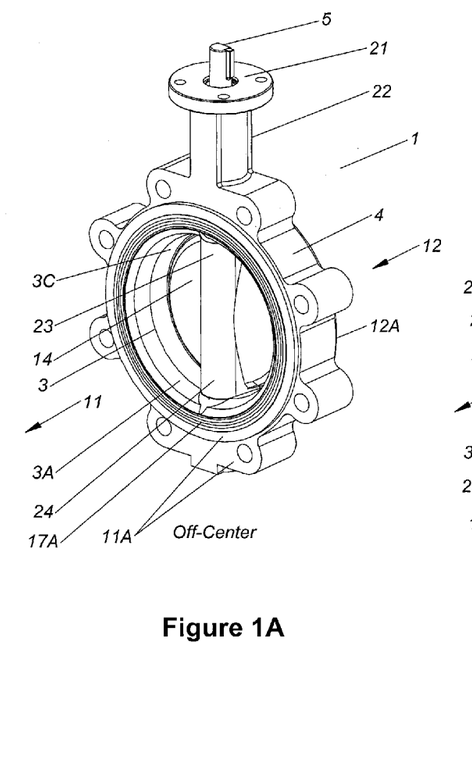
FIG. 1A is an isometric view of an off-center valve.
Figure 1B:
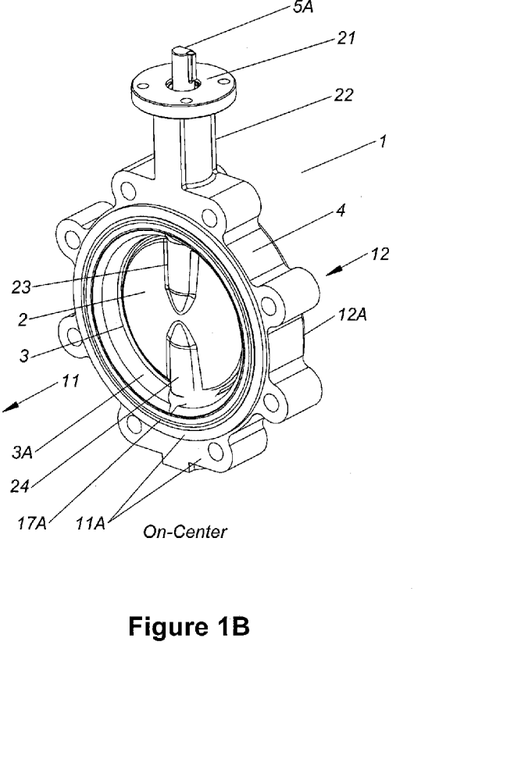
FIG. 1B is an isometric view of an on-center valve.

The resilient seated butterfly valve 1 with interchangeable on-center disc 2 or off-center disc 14, as shown in FIGS. 1A and 1B, allows the use of a common valve body 4, including its seal surface 3C, and bearings 8, with either an on-center or off-center disc 2 or 14. At least the discs 2 and 14 can be changed in multiple embodiments to convert from an on-center to an off-center disc 2 and 14 configuration.

The ability to use interchangeable discs 2 and 14 and provide effective sealing is due to the seat geometry, which has a spherical seal surface 3C on body seat 3D and a mating spherical sealing edge 2C on on-center disc 2 and a mating spherical sealing edge 14C on off-center disc 14. The spherical seat seal 3 may be configured to (i) be a replaceable floppy boot, (ii) be a replaceable boot molded on rigid backing, or (iii) be molded (vulcanized) to the body. The seat may be made of a variety of elastomeric/polymeric materials to best suit the application.

Figure 2A:
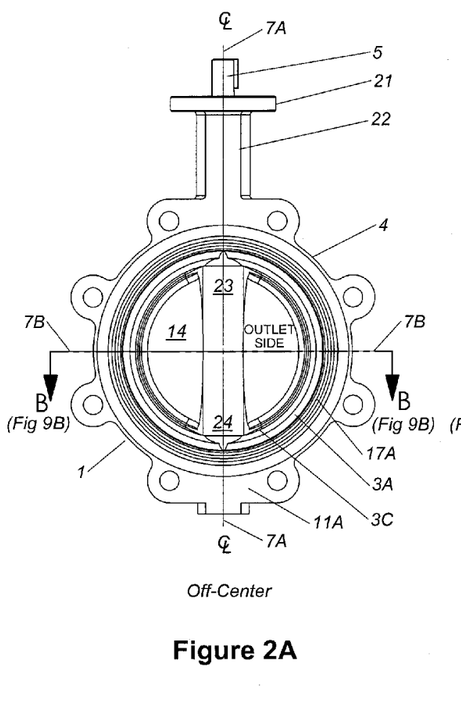
FIG. 2A is an elevation view of an off-center valve from the vantage point of the outlet port 11.
Figure 2B:
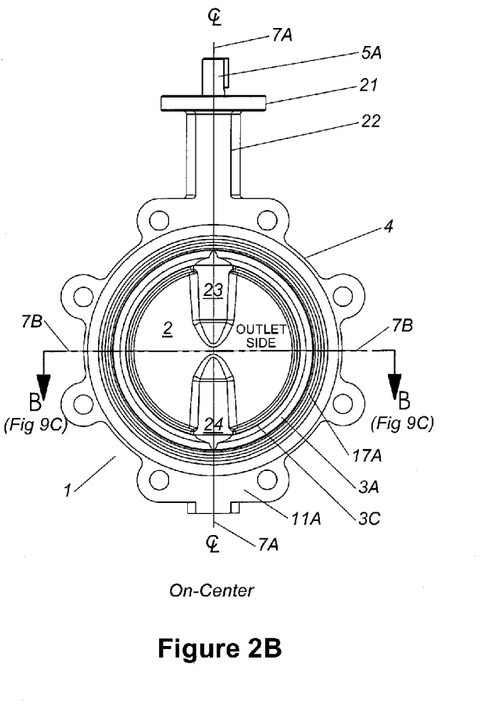
FIG. 2B is an elevation view of an on-center disc valve.

Body 4, shaft 5 of both on-center disc 2 and off-center disc 14, and seal surface 3C are centered along vertical center-line 7A, as shown in FIGS. 2A and 2B. The location of body 4, shaft 5 of both on-center disc 2 and off-center disc 14, and seal surface 3C along vertical center-line 7A improves seating performance and throttling accuracy. Placing shaft 5 in the center of resilient seal surface 3C and using either on-center disc 2 or off-center disc 14 allows bi-directional, uninterrupted 360 degree seating within valve body 4 both for on-center disc 2 and off-center disc 14. This minimizes seat wear and leads to longer valve life.

Butterfly valve 1 has a spherical disc 2 or 14 and a spherical seal surface 3C. The spherical disc may be either an on-center 2 or off-center 14 disc (they are interchangeable), both of which are seated in resilient seal surface 3C. The mating spherical configuration insures minimum interference between seal surface 3C and disc 2 or 14. Both spherical sealing edges 2C and 14C of spherical discs 2 and 14 and seal surface 3C have a common spherical center.

The center of spherical sealing edge 2C or 14C and seal surface 3C is located at the intersection of a vertical centerline 7A that extends through shaft 5 and a horizontal centerline 7B that extends through the center of disc 2 or 14. Spherical sealing edges 2C and 14C of on-center and off-center discs 2 and 14 and spherical seal surface 3C are generated by rotating seat spherical surface 3E (shown in FIG. 9), the origin of which is located at the intersection of vertical centerline 7A and horizontal centerline 7B (shown in FIGS. 3A and 3B), through 360°. Front face 14A of off-center disc 14 extends slightly beyond front face 2A of on-center disc 2. Consequently, front face 14A of off-center disc 14 is eccentric in that it is farther off the vertical centerline 7A than is the periphery 2A of on-center disc 2. Correspondingly, when off-center disc 14 is in a closed position its front face 14A seals along seal surface 3C at a different location than does the periphery 2A of on-center disc 2. Since both front face 2A and 14A are facing towards inlet port 12, the sealing location of disc 14 will be closer to inlet port 12 than will that of disc 2.

The spherical design of disc 2 or 14 and seal surface 3C allows the use of both on-center and off-center discs 2 or 14 in a common body 4. Spherical disc 2 and 14 and spherical, molded-in seat seal 3 with seal surface 3C permits the use of lower opening and closing torque, a higher pressure rating, and a longer cycle life.

Tight shut off of butterfly valve 1 is achieved without the use of interference type, torque actuated seats, which require high torque to achieve shut off. The spherical design of resilient seal surface 3C and disc 2 or 14 makes it possible to keep disc 2 and 14 in a closed position without any torque and yet have a seal surface 3C and disc 2 or 14 combination that is leak free. The spherical geometry allows seal surface 3C to seal at any point where it is in contact with the spherical sealing edge 2C or 14C, i.e., the resilient seal surface 3C is less position sensitive. Consequently, the actuator closed position stop can be adjusted more extensively to allow for wear of seal surface 3C. The actuator stop setting can also be more extensively adjusted because butterfly valve 1 is less sensitive to exacting closed position settings. Moreover, the spherical geometry of resilient seal 3C makes assembly setting of the actuator easier and its service life longer.

Interchangeable on-center disc 2 and off-center disc 14 minimizes inventory of valve bodies 4 because one and the same body 4 accommodates either on-center or off-center discs 2 and 14. The use of a common body 4 for both disc types also reduces manufacturing costs and insures manufacturing economies of scale, which allows the manufacturer to lower the price point for its valves. The molded in seal 3 and its configuration enhances the life cycle of valve 1.

As compared to on-center disc valves 2, off-center disc valves 14 have higher inherent pressure ratings and higher resistance to fluid transients. Unlike currently available off-center disc 14 butterfly valves, seating of butterfly valve 1 is fully rated bi-directional, operating torque is substantially reduced, and operating torque is substantially less for equivalent shutoff pressure rating. This reduces the cost of an actuated valve with off-center disc 14 butterfly valve 1 (and indirectly the cost of on-center disc 2 butterfly valve) as compared to the currently available valves because the size of the valve actuator need not be increased to overcome the high operating torque of the currently available valves during opening or closing. Both on-center and off-center discs 2 and 14 can provide increased bi-directional shutoff.

Furthermore, the off-center disc 14 helps sweep solids from seal surface 3C. Off-center disc 14 also provides positive sealing for extended service life because the edge of the disc is always contacting seal surface 3C until the disc is rotated off the seat in an open direction. Discs 2 and 14 are corrosion resistant or coated with corrosion resistant material.

On-Center Disc Configuration

Figure 3A:
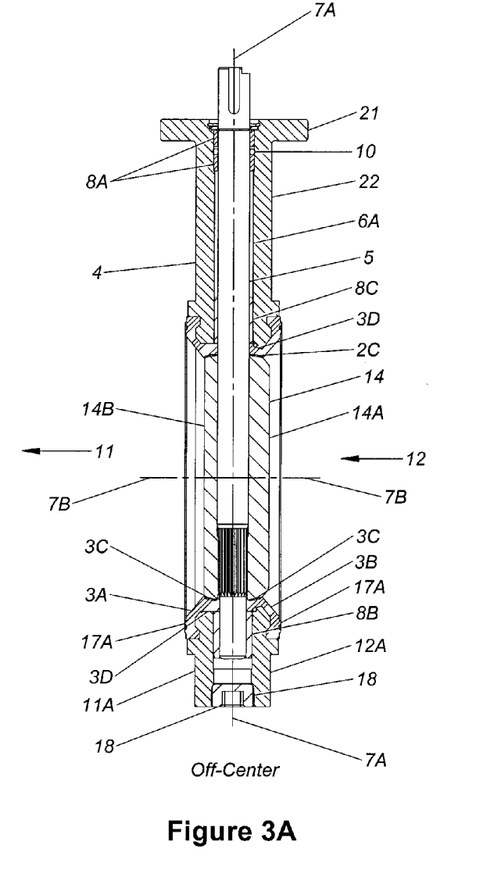
FIG. 3A is a cross-sectional view of an off-center valve taken along the centerline 7A of FIG. 2A.
Figure 3B:
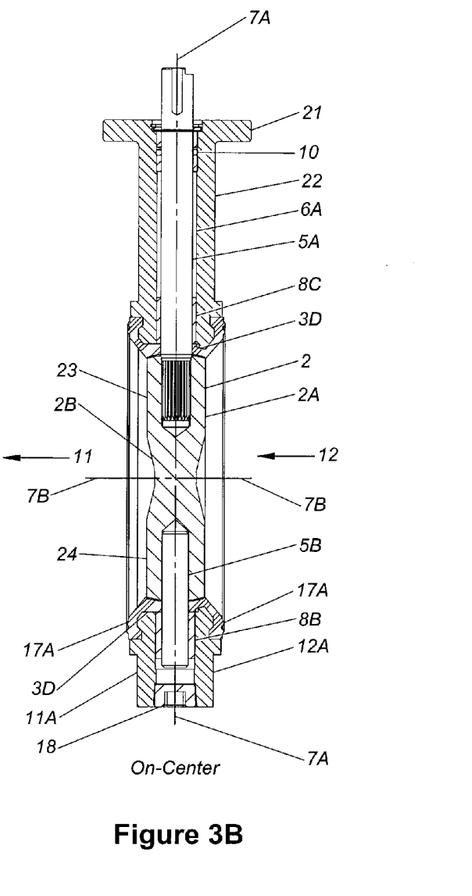
FIG. 3B is a cross-sectional view of an on-center disc valve taken along the centerline 7A of FIG. 2B.

FIG. 1B is an isometric view illustrating an embodiment of butterfly valve 1 with on-center disc 2. FIG. 1B illustrates valve 1 with a lugged body 4, but another embodiment has a wafer body 4 (not shown). Disc 2 of valve 1 is shown in a closed position in FIGS. 1B, 2B, and 3B. On-center disc 2 has upper hub 23 for receiving upper shaft 5A in upper shaft attachment 23A (FIG. 11) and lower hub 24 for receiving lower shaft 5B in lower shaft attachment 24A. Shafts 5A and 5B rotate within body 4 along vertical center-line 7A of body 4. Butterfly valve 1 has outlet port 11, which is defined by outlet flange 11A, and inlet port 12, which is defined by inlet flange 12A. Outlet flange 11A is partially covered by flange seal 17A. Inlet flange 12A is also partially covered by flange face seal 17A (FIG. 3B). Flange face seal 17A provides a leak-proof seal between the outlet flange 11A and the valve 1 and flange face seal 17B provides a leak-proof seal between the inlet flange 12A and the valve 1, when the valve is coupled to the flanges of a piping system of which valve 1 is a component part. In an embodiment, flange face seal 17A is an integral part of resilient, elastomeric seat seal 3. Elastomeric seal surface 3C and flange face seal 17A may be molded to body 4 by, for example, vulcanization. Seat seal 3 is comprised of outlet ramp surface 3A, seal surface 3C, and inlet ramp surface 3B. Seal surface 3C is of a slightly different configuration on the inlet port 12 side as compared to that of the outlet port 11 side for ease of installation of the disc. Upper shaft 5A protrudes above actuator mounting flange 21 for engagement with an actuator (not shown). Flange 21 mates with a similar surface on the actuator. Upper shaft 5A extends within bore 6A through actuator mounting flange 21, neck 22, and into upper shaft attachment 23A where upper shaft 5A is affixed to disc 2. Lower shaft 5B is seated for rotational movement in lower bore 6B and is affixed within shaft attachment 24A.

FIGS. 2A and 2B are views of butterfly valve 1 from outlet port 11. FIGS. 2A and 2B show the vertical centerline 7A of valve 1, which is also the vertical centerline of shaft 5 for both on-center and off-center discs 2 and 14. Horizontal centerlines 7B of on-center and off-center discs 2 and 14 are also shown. As previously mentioned, spherical sealing edges 2C and 14C of spherical discs 2 and 14 and seal surface 3C are defined by a section of a sphere whose center point is located at the intersection of vertical centerline 7A of shaft 5 and horizontal centerline 7B of discs 2 and 14. The spherical sealing edge 2C and the seat spherical surface 3E are the same. Spherical on-center and off-center discs 2 and 14 and spherical seal surface 3C insure minimum interference between seal 3C surface and discs 2 and 14. The spherical design of discs 2 and 14 and seal surface 3C allows the use of both on-center and off-center discs 2 and 14 in a common body 4. Elastomeric seat seal 3 may be molded to body seat 3D (FIGS. 3A, 3B, and 8A) of body 4 by vulcanization. Elastomeric seat seal 3 is comprised of flange seal 17A, outlet and inlet ramps 3A and 3B, and seal surface 3C. Seal surface 3C is a seat with a spherical surface that mates with the spherical sealing surfaces 2C and 14C of discs 2 and 14. Body 4 is illustrated as a lugged body, but it may also be a wafer body.

Figures 8, 8A, 8B:
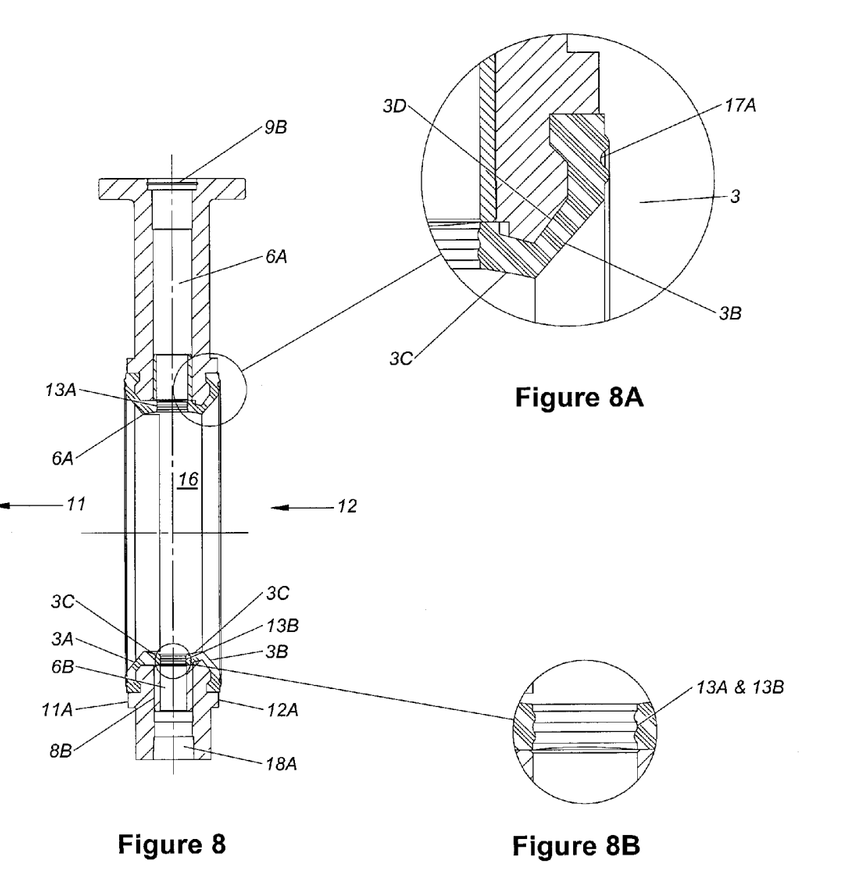
FIG. 8 is a cross-sectional view of body 4, seat seal 3, and upper and lower secondary seals 13A and 13B taken along line A-A of FIG. 7.
FIG. 8A is a detail of seat seal 3.
FIG. 8B is a detail view of molded secondary seals 13A and 13B.

FIG. 3B is a side view of valve 1. Disc 2 has front face 2A and rear face 2B. When valve 1 is in a closed position, front face 2A faces towards inlet port 12. Disc 2 is positioned in body 4 by upper shaft 5A and lower shaft 5B. Another embodiment of valve 1 has a single shaft 5 instead of upper and lower shafts 5A and 5B. Integral single shaft 5 or upper and lower shafts 5A and 5B can be used with on-center or off-center discs 2 or 14 (FIG. 3A). Upper shaft 5A rotates within upper bearing 8A and middle bearing 8C. Lower shaft 5B rotates within lower bearing 8B (best shown in FIG. 3A). If integral single shaft 5 is used in either on-center or off-center discs 2 or 14, the upper portion of shaft 5 rotates within corrosion resistant upper and lower bearings 8A and 8C and the lower portion of shaft 5 rotates within corrosion resistant lower bearing 8B (not shown). Throughout this specification bearings 8A, 8B, and 8C as well as other bearings, may simply be referred to as "bearing 8." Fluid leakage along upper shaft 5A and lower shaft 5B is primarily eliminated by an interference fit between shafts 5A and 5B and secondary seals 13A and 13B (FIGS. 8 and 8B). Fluid leakage along upper shaft 5A and lower shaft 5B is secondarily eliminated by O-rings 10 on shafts 5A and 5B. Upper portion of shaft 5 or upper shaft 5A, as the case may be, is axially aligned with upper bore 6A and extends through actuator mounting flange 21, neck 22 and, in the case of upper shaft 5A, into upper shaft attachment 23A where it is affixed to disc 2 or 14. Upper portion of shaft 5 or shaft 5A connects to an actuator that rotates shaft 5 or 5A for opening and closing valve 1. The top of lower shaft 5B is affixed into lower hub 24. The top portion of lower shaft 5B extends into lower shaft attachment 24A of hub 24. The bottom portion of lower shaft 5B extends through seal surface 3C into lower bore 6B of body 4, where shaft 5B is free to rotate in unison with upper shaft 5A. Circumferential body seat 3D of body 4 is surrounded by resilient seal 3. Resilient seat seal 3 is made of industrial grade rubber. Seal surface 3C engages spherical sealing edge 2C of disc 2 or sealing edge 14C of disc 14 in the closed position for tight, leak proof shut-off of valve 1.

Figure 4:
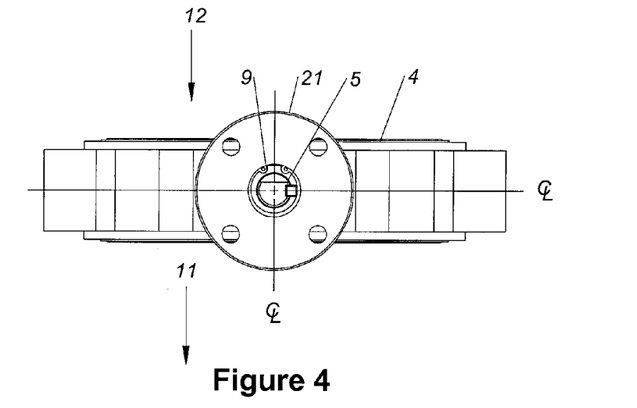
FIG. 4 is a plan view of the top of valve 1 illustrating retaining ring 9 on the shaft 5.

FIG. 4 is a top view of valve 1 showing retaining ring 9 for retaining upper shaft 5A in upper bore 6A.

Figure 5:
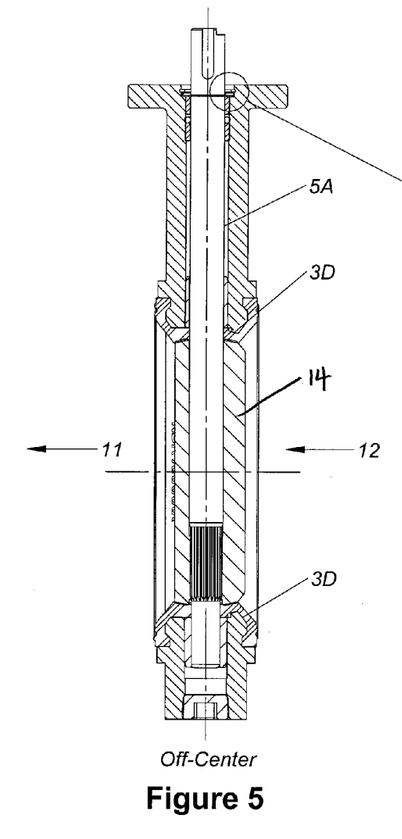
FIG. 5 is a cross-section of a valve with off-center disc 14.
Figure 5A:
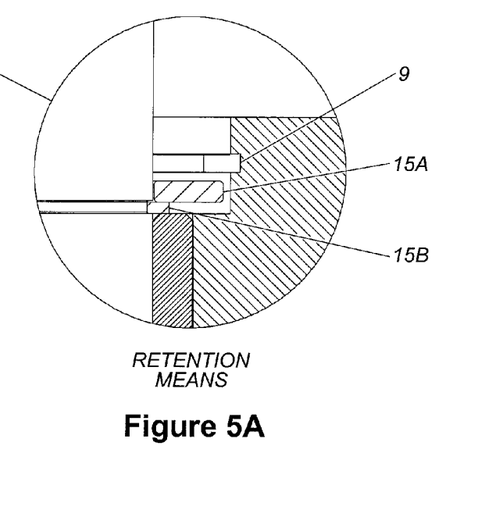
FIG. 5A is a detail of shaft 5A retention means.

FIG. 5 shows an off-center disc. FIG. 5A is a detail of the upper shaft 5A retention means, which limits vertical movement of upper shaft 5A. The retention means also limits lateral movement of upper shaft 5A in bore 6A. The retention means is comprised of spiral retaining ring 15B, closed retaining washer 15A on top of spiral retaining ring 15B, and retaining ring 9 on top of closed retaining washer 15A. The retention means is the same for an on-center or off-center disc 2 or 14.

Figure 6:
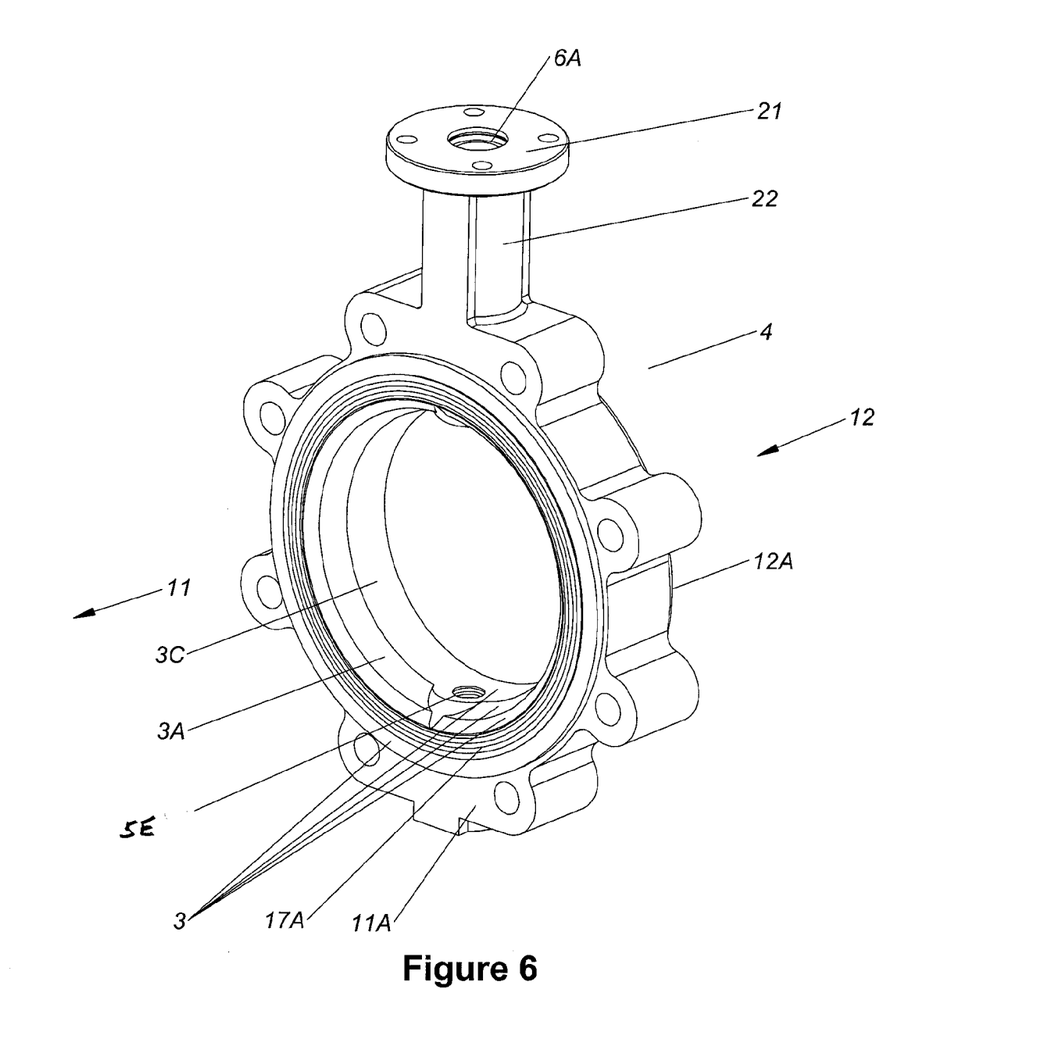
FIG. 6 is an isometric view of body 4 (and molded in seat) from the vantage point of outlet port 11.

FIG. 6 is an isometric view of body 4 from the vantage point of outlet port 11 showing upper bore 6A, lower bore 6B, and elastomeric seat seal 3 comprised of flange seal 17A, outlet ramp 3A, seal surface 3C, and inlet ramp 3B (not shown in FIG. 6). Seal 3C seats the spherical sealing edge 2C of on-center or off-center discs 2 or 14.

Figure 7:
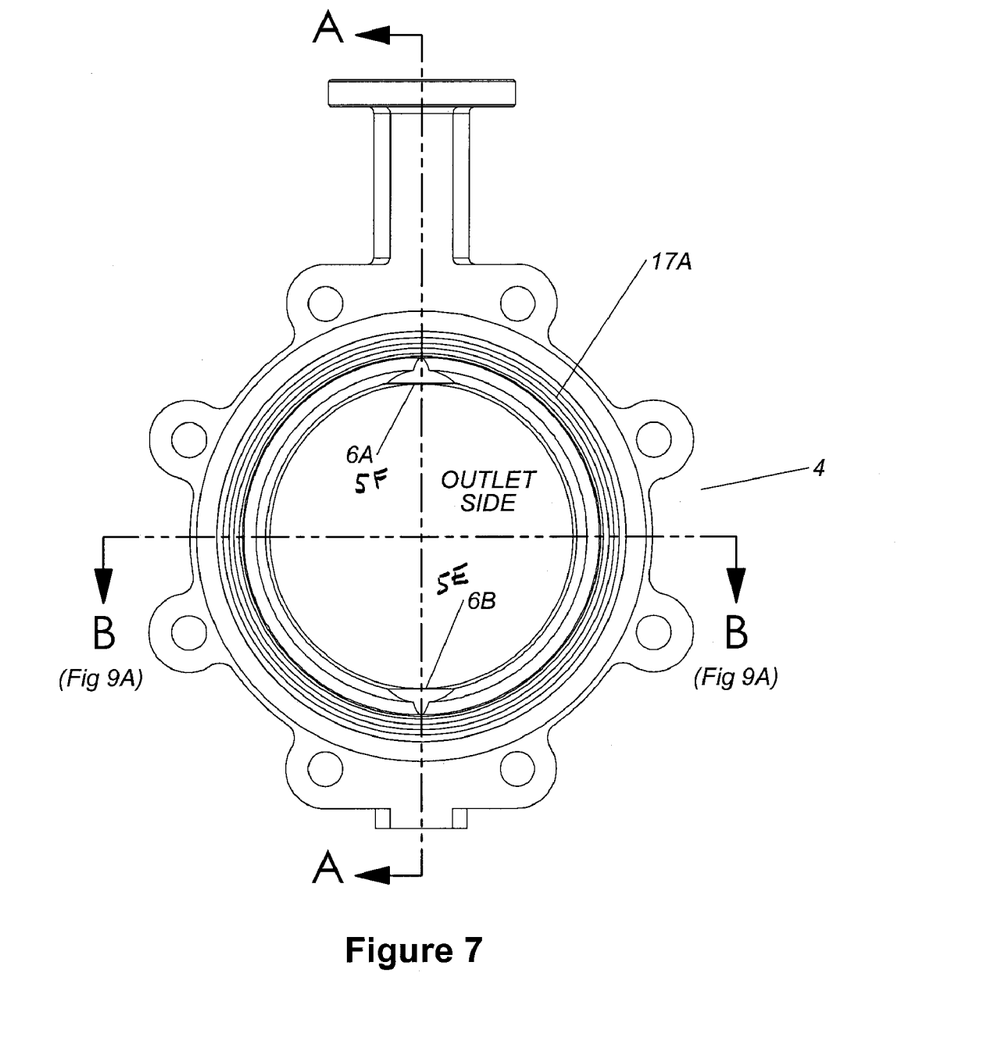
FIG. 7 is a elevation view of body 4 from the vantage point of outlet port 11.

FIG. 7 is a elevation view of body 4 from the vantage point of outlet port 11 showing upper and lower bores 6A and 6B and flange seal 17A. Flange seal 17A forms a leak tight seal between pipes 17 attached to the outlet and inlet ports 11 and 12. Body 4 is commonly cast iron or ductile iron, but may be of another metal, a polymer, or other materials.

FIG. 8 is a cross-sectional view taken along line A-A of FIG. 7. FIG. 8 shows chamber 16 of valve 1. The chamber 16 lies between inlet flange 12A and outlet flange 11A. The length of chamber 16 is relatively short compared to its diameter. The retaining means for shafts 5 or 5A is housed in retention means aperture 9B. Upper bore 6A has upper secondary seal 13A and lower bore 6B has lower secondary seal 13B. Plug aperture 18A is shown below lower secondary seal 13B. Upper bearing 8A is above upper secondary seal 13A and lower bearing 8B is below lower secondary seal 13B (FIG. 3A is best for illustrating bearings).

FIG. 8A is a detail of resilient seat seal 3. It is also discussed below in conjunction with FIG. 9. Seat seal 3 is made of elastomeric material. Seat seal 3 may be molded separate from body 4, and thereby be replaceable. Alternatively, it may be directly molded to body seat 3D of body 4 and thereby be integral with body 4. Seat seal 3 may, for example, be molded by a vulcanization process.

FIG. 8A shows seat seal 3 from the vantage point of inlet port 11. Seat seal 3 is comprised of flange seal 17A, inlet ramp 3B, seal surface 3C, and outlet ramp 3A (FIG. 3A). As disc 2 or 14 turns from an open to a closed position its spherical sealing edge 2C impinges inlet ramp 3B or outlet ramp 3A, depending upon where disc 2 or 14 is positioned in its 360° arc of rotation, compresses the respective ramp 3B or 3A until disc 2 or 14 rotates into seal surface 3C and is seated. Ramps 3B and 3A are lead in surfaces for spherical sealing edge 2C. The ramps are designed to be compressible and angled so as to avoid abrading, tearing, and wear of seal surface 3C during closure of disc 2 or 14. Seat seal 3 serves two purposes. One is accomplished by seal surface 3C, which provides a leak proof seal that surrounds spherical sealing edge 2C or 14C of disc 2 or 14 in the closed valve position. The other is accomplished by flange seals 17A and 11A, which provides a seal between inlet and outlet flanges 11A and 12A and inlet pipes 17. Inlet ramps 3A and 3B restricts movement of seat seal 3 when it is under pressure in high flow conditions, thereby insuring bidirectional sealing and keeping actuator torque substantially the same with pressure flow in either direction.

FIG. 8B is a detail view of molded secondary seals 13A and 13B. Secondary seals 13A and 13B are made of elastomeric material and stop leakage into bearings 8.

Figure 9A:
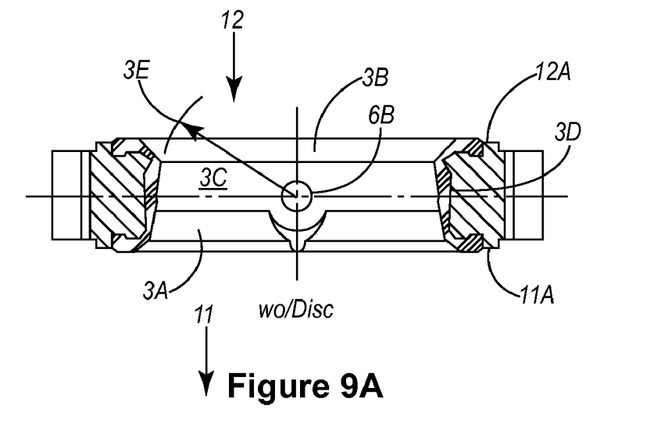
FIG. 9A is a cross-sectional view of the valve body with molded in seat.
Figure 9B:
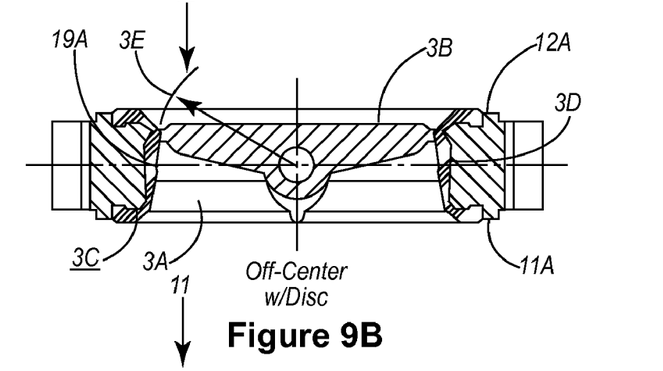
FIG. 9B is a cross-sectional view of an off-center valve taken along line B-B of FIG. 2A.
Figure 9C:
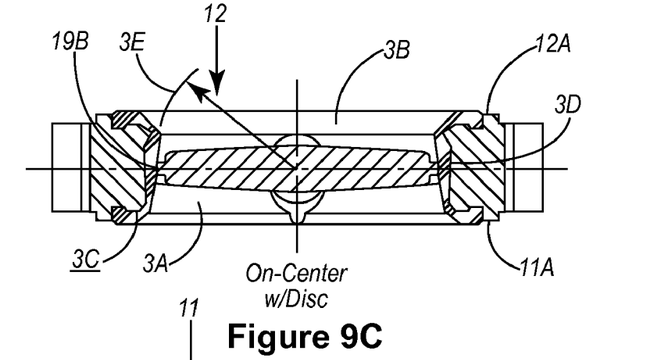
FIG. 9C is a cross-sectional view of an on-center valve taken along line B-B of FIG. 2B.

FIGS. 9B and 9C are cross-sectional views of valve 1 taken along line 7B-7B of FIGS. 3A and 3B. FIGS. 9A and 9B show seat seal 3 from the vantage point of both inlet port 12 and outlet port 11. FIGS. 9A and 9B illustrate seat seal 3 and its components. Seat spherical surface 3E is the radius of seal surface 3C and of spherical sealing edge 14C or 2C of off-center disc 14 and on-center disc 2. FIGS. 9A and 9B also illustrate separate seal regions 19A and 19B. Separate seal regions 19A and 19B are both located on seal surface 3C. In other words, seal surface 3C is the sealing surface for both discs 14 and 2. The geometry of seat seal 3 allows full bi-directional rotation of either disc 14 or 2 within butterfly valve 1. The geometry also allows the use of low actuator torque for opening and closing valve 1.

As shown in FIG. 9A, seal region 19A is that portion of seal 3C that mates with spherical sealing edge 14C of off-center disc 14 when disc 14 is in a closed position. In contrast, front face 14A of off-center disc 14 is centered on shaft 5, or shaft 5A and shaft 5B, so its spherical sealing edge 14C mates with seal region 19A on seal surface 3C. Off-center seal region 19A is located on seal surface 3C at a point close to inlet flange 12A.

As shown in FIG. 9C, seal region 19B is that portion of seal surface 3C that mates with spherical sealing edge 2C of on-center disc 2 when disc 2 is in a closed position. Front face 2A of on-center disc 2 is centered on shaft 5, or shaft 5A and shaft 5B, so its spherical sealing edge 2C mates with seal region 19B on seal 3C. On-center seal region 19B is located on seal surface 3C at a point close to outlet flange 11A.

As shown in FIGS. 9B and 9C, the angle of elastomeric seat seal 3 on outlet ramp 3A is somewhat different than the angle on inlet ramp 3B. The ramp angles differ because the distance between inlet flange 12A of inlet port 12 and front face 2A or 14A of the disc is less than the distance between outlet flange 11A of outlet port 11 and rear face 2B or 14A of the disc. The rather small distance between inlet flange 12A and front face 2A of the disc facilitates easy installation of discs 2 and 14 in body 4. The difference in ramp angles 3A and 3B has no negative effect on butterfly valve 1. For example, the diameter of the inlet port 12 and the outlet port 11 are the same, so flow through butterfly valve 1 is constant. Furthermore, reverse installation of butterfly valve 1 is unaffected.

Figure 10:
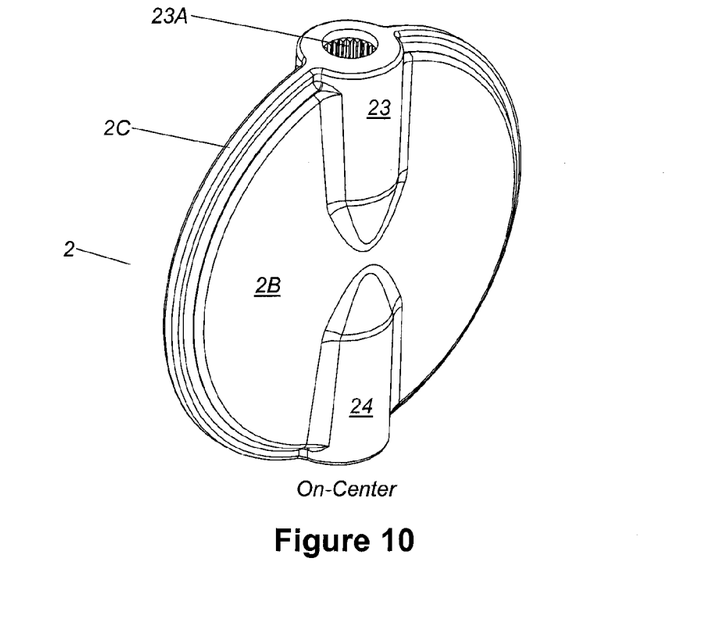
FIG. 10 is an isometric view of an on-center disc 2 from the vantage point of the face 2B.

FIG. 10 is an isometric view illustrating an embodiment of on-center disc 2 from rear face 2B. It shows upper and lower hub 23 and 24, as well as upper shaft attachment 23A, and spherical sealing edge 2C for mating engagement with seal surface 3C at on-center seal region 19B.

Figure 11:
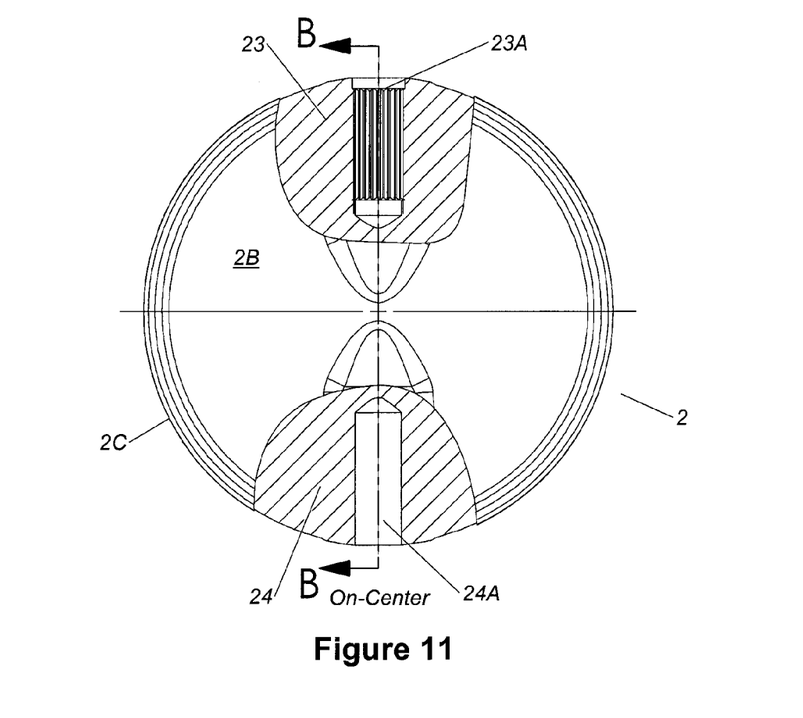
FIG. 11 is an elevation view from the face 2B of on-center disc 2 with a cut-away of upper and lower hubs 23 and 24 and shaft attachments 23A and 24A.

FIG. 11 is an elevation view of the rear face 2B of on-center disc 2 showing cut-away of upper hub 23 and upper shaft attachment 23A and lower hub 24 and lower shaft attachment 24A.

Figure 12:
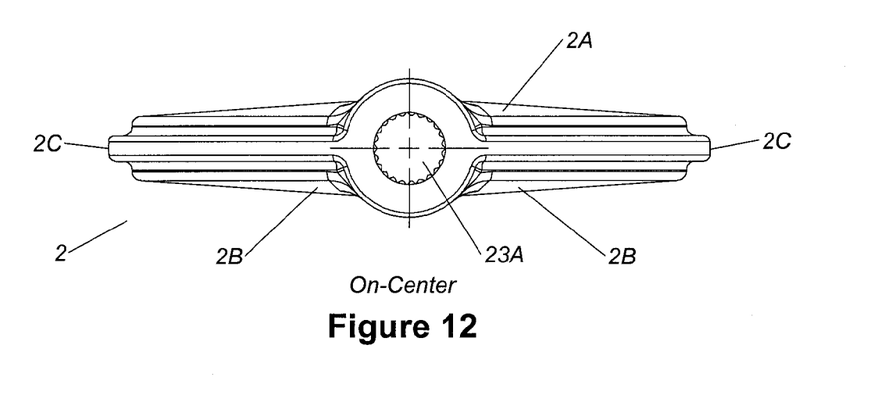
FIG. 12 is a plan view of the top of on-center disc 2.

FIG. 12 is a top view of disc 2. It shows spline 30 of upper shaft attachment 23A for mating engagement with upper shaft 5A, front face 2A, rear face 2B, and spherical sealing edge 2C.

Figure 13:
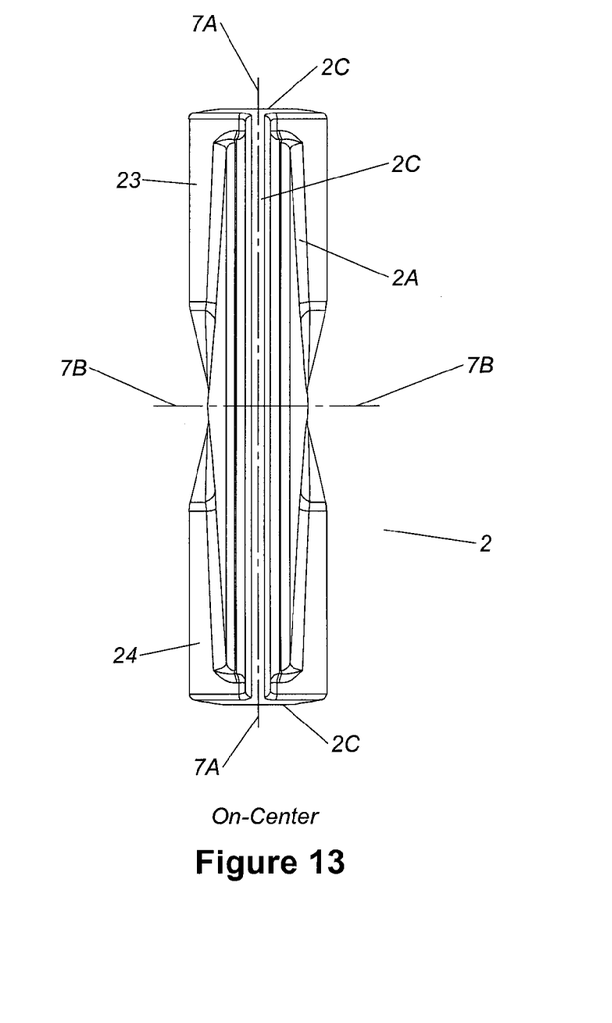
FIG. 13 is a side view of disc 2.

FIG. 13 is a side view of disc 2 taken along line B-B of FIG. 11. FIG. 13 most clearly illustrates spherical sealing edge 2C. The center of the spherical sealing edge 2C, body 4, and seal surface 3C is located at the intersection of vertical centerline 7A and horizontal centerline 7B of disc 2.

Figure 14:
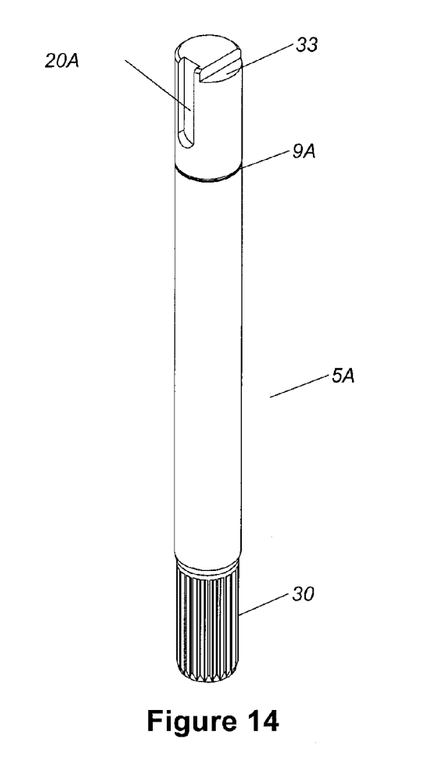
FIG. 14 is an isometric view of upper shaft 5A.

FIG. 14 is an isometric view of upper shaft 5A. Spline 30 is shown and is engaged with upper shaft attachment 23A. Disc position indicator 33 engages with an actuator as does combination keyway 20A and key. Retaining ring 9 engages with illustrated slot 9A.

Figure 15:
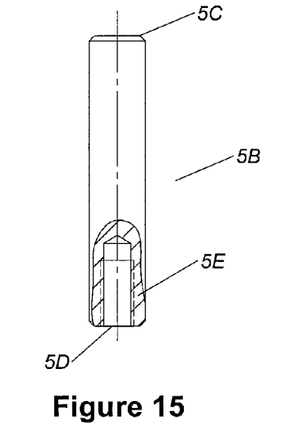
FIG. 15 is an elevation view of lower shaft 5B.

FIG. 15 is an elevation view of lower shaft 5B for engagement with lower shaft attachment 24A. Lower shaft 5B also has upper end 5C and lower end 5D. Lower end 5D may have aperture 5E for receiving a pin about which lower end 5D may rotate.

Off-Center Disc Configuration

Figures 16, 18:
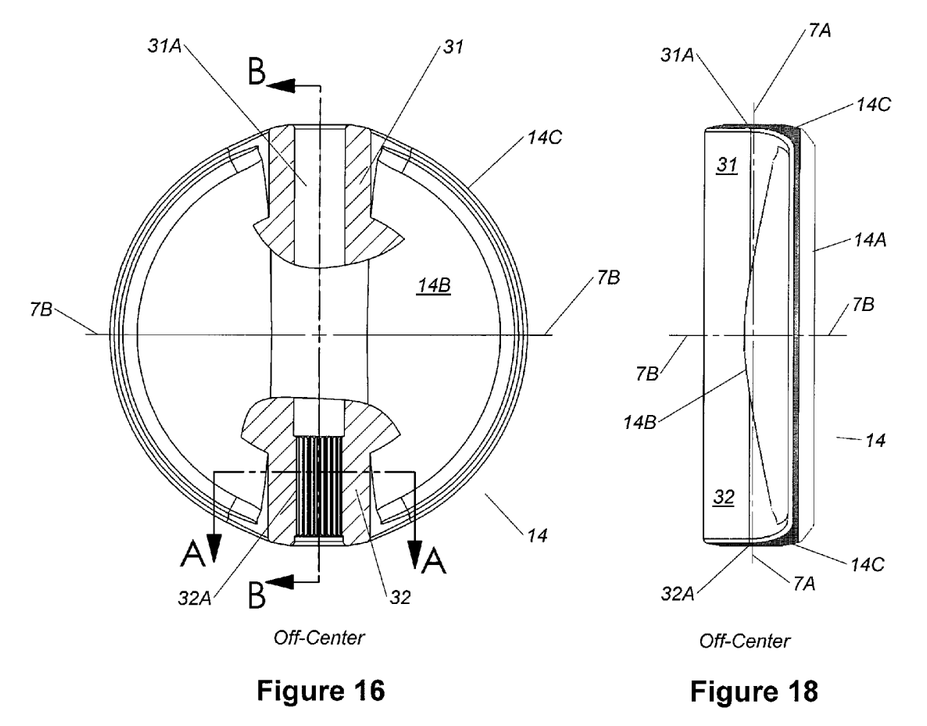
FIG. 16 is an elevation view of off-center disc 14 from its rear face 14B.
FIG. 18 is a side view of off-center disc 14.

FIG. 16 is an elevation view of off-center disc 14 from rear face 14B. FIG. 16A is a top plan view of off-center disc 14 and FIG. 16B is an isometric view of off-center disc 14 from its rear face 14B. This embodiment of off-center disc 14 is designed to accommodate a single piece shaft 5. On-center disc 2 of FIG. 3B is thinner than off-center disc 14 shown in FIG. 16 because upper shaft 5A and lower shaft 5B of disc 2 do not go through the entire disc 2 as does single piece shaft 5 of disc 14. As a result, thicker, off-center disc 14 is the stronger of the two. But, thinner disc 2 allows greater fluid flow through valve 1. Another embodiment of off-center disc 14 is designed to accommodate an upper shaft 5A and a lower shaft 5B.

Upper and lower sleeves 31 and 32 receive single piece shaft 5 within shaft attachments 23A and 32A, respectively. Shaft attachment 32A has a spline 30 in lower shaft bore 32A. Disc 14 has spherical sealing edge 14C.

Figure 17:
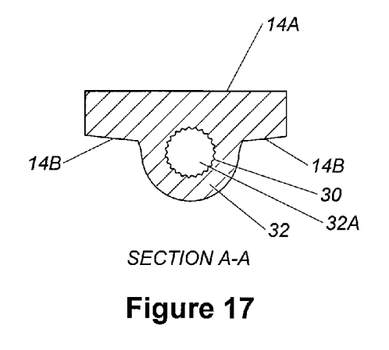
FIG. 17 is a cut-away view taken along line A-A of FIG. 16.

FIG. 17 is a cut-away along line A-A of FIG. 16. FIG. 16 shows lower sleeve 32, with spline 30 in shaft attachment 32A. The front face of the disc is shown at 14A and the rear face is at 14B.

FIG. 18 is a plan view of disc 14 taken along line B-B of FIG. 16. FIG. 18 illustrates spherical sealing edge 14C. The center of spherical sealing edge 14C, body seat 3D, and seal surface 3C is located at the intersection of vertical centerline 7A and horizontal centerline 7B of disc 14. Spherical sealing edge 14C of off-center disc 14A is farther out from centerline 7A of valve 1 than is spherical sealing edge 2C of the on-center disc 2. Spherical sealing edge 14C, therefore, engages with off-center seal region 19A. Consequently when valve 1 is in the closed position, front face 14A of off-center disc 14 is closer to inlet flange 12A than is front face 2A of on-center disc 2.

Figure 19:
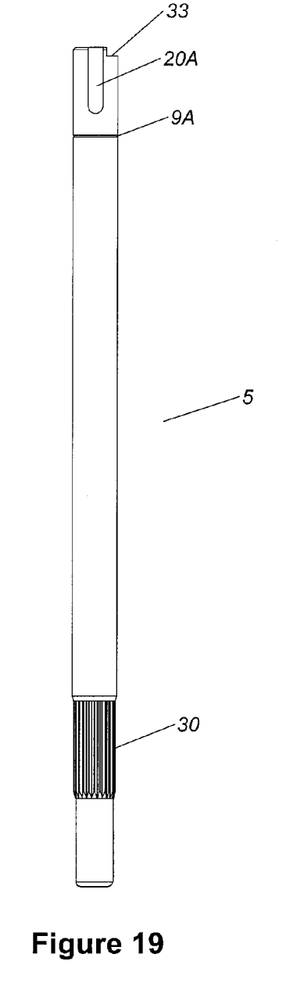
FIG. 19 is a view of single piece shaft 5.

FIG. 19 is a view of integral, single piece shaft 5 with spline 30, keyway 20A, and disc position indicator 33. Keyway 20A and disc position indicator 33 are for engagement with an actuator. The retaining ring slot is shown at 9A.

The many features and advantages of the embodiments are apparent from the detailed specification, and thus, it is intended by the appended claims to cover all such features and advantages of the embodiments which fall within the true spirit and scope of the embodiments. Further, since numerous modifications and variations will readily occur to those skilled in the art, it is not desired to limit the embodiments to the exact construction and operation illustrated and described, and accordingly, all suitable modifications and equivalents may be resorted to, falling within the scope of the claims.

We claim:

1. A butterfly valve having interchangeable discs comprising:
   (a) a body having a rotatable shaft aligned with a vertical center-line of the body;
   (b) a circumferential seal affixed to a circumferential body seat;
   (c), wherein the interchangeable discs comprise an on-center disc affixed to the shaft or an off-center disc affixed to the shaft, the on-center disc and the off-center disc interchangeable with one another;
   (d) the circumferential seal surface comprising (i) a section of a sphere, the center of which is located on the intersection of the vertical center-line extending through the shaft and the horizontal center-line extending through the horizontal center of either disc; (ii) a spherical off-center seal region proximal to the inlet port; and (iii) a spherical on-center seal region distal from the inlet port;
   (e) the on-center disc comprising (i) a spherical sealing edge, the center of which is located on the intersection of the vertical center-line extending through the shaft and the horizontal center-line extending through the horizontal center of either disc; (ii) the spherical sealing edge configured for closure with the on-center seal region; and (iii) a front face of the on-center disc; and
   (f) the off-center disc comprising (i) a spherical sealing edge, the center of which is located on the intersection of the vertical center-line extending through the shaft and the horizontal center-line extending through the horizontal center of either disc; (ii) the spherical sealing edge configured for closure with the off-center seal region; and (iii) an eccentric front face of the off-center disc, the front face of which extends beyond the front face of the on-center disc.

2. The butterfly valve of claim 1, comprising: (a) an outlet flange seal for sealing between an outlet flange and an outlet pipe and (b) an inlet flange seal for sealing between an inlet flange and an inlet pipe.

3. The butterfly valve of claim 2, comprising a compressible outlet ramp and a compressible inlet ramp for leading the spherical disc sealing edges or into a closed position.

4. The butterfly valve of claim 3 wherein the circumferential seat seal also comprises (a) a smaller distance between the inlet flange and the front face compared to the distance between the outlet flange and the rear face; (b) an angle of the inlet ramp that is steeper than the angle of the outlet ramp; and (c) whereby installation of the discs is facilitated.

5. The butterfly valve of claim 1 wherein the circumferential seat seal also comprises upper and lower end apertures for rotatable mounting of shaft on the vertical center-line extending through shaft.

6. The butterfly valve of claim 1 wherein the areas of the inlet and outlet ports are the same, whereby fluid flow through the valve is constant.

7. The butterfly valve of claim 1, wherein the on-center or off-center discs have 360° sealing edges and have bi-directional shutoff to the full pressure rating of the valve.

8. The butterfly valve of claim 2, wherein the outlet flange seal and inlet flange seal are integral parts of the seat seal.

9. The butterfly valve of claim 3, wherein the outlet ramp and inlet ramp are integral parts of the seat seal.

10. The butterfly valve of claim 3, wherein the outlet flange seal, inlet flange seal, outlet ramp, and inlet ramp are integral parts of the seat seal.

* * * * *